Nov. 28, 1950     A. P. NEYHART     2,531,639
PHOTOGRAPHIC SHUTTER

Filed Dec. 10, 1946     9 Sheets-Sheet 1

INVENTOR.
ARTHUR P. NEYHART,
BY
ATTORNEY.

Nov. 28, 1950  A. P. NEYHART  2,531,639
PHOTOGRAPHIC SHUTTER
Filed Dec. 10, 1946  9 Sheets-Sheet 2

INVENTOR.
ARTHUR P. NEYHART,
BY
ATTORNEY.

Nov. 28, 1950     A. P. NEYHART     2,531,639
PHOTOGRAPHIC SHUTTER
Filed Dec. 10, 1946     9 Sheets-Sheet 3
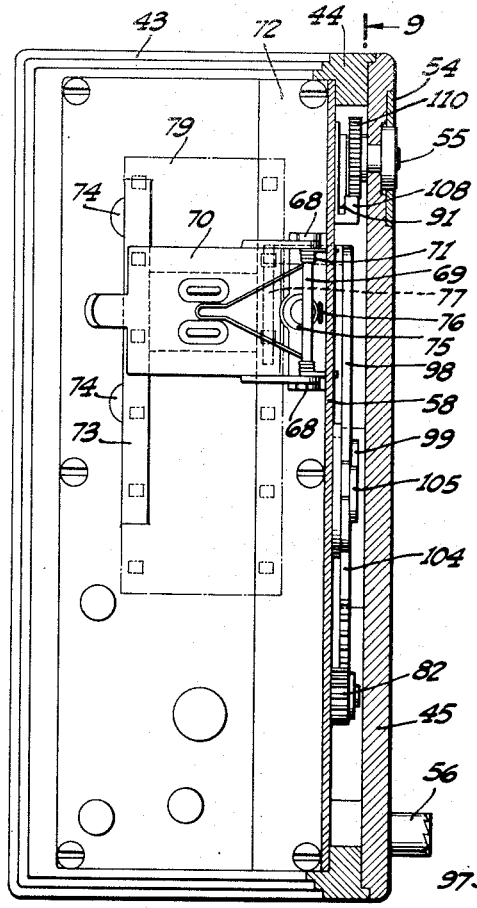
FIG. 8.
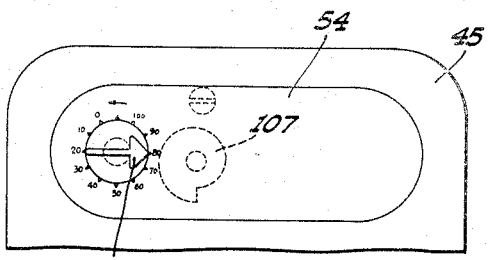
FIG. 10.
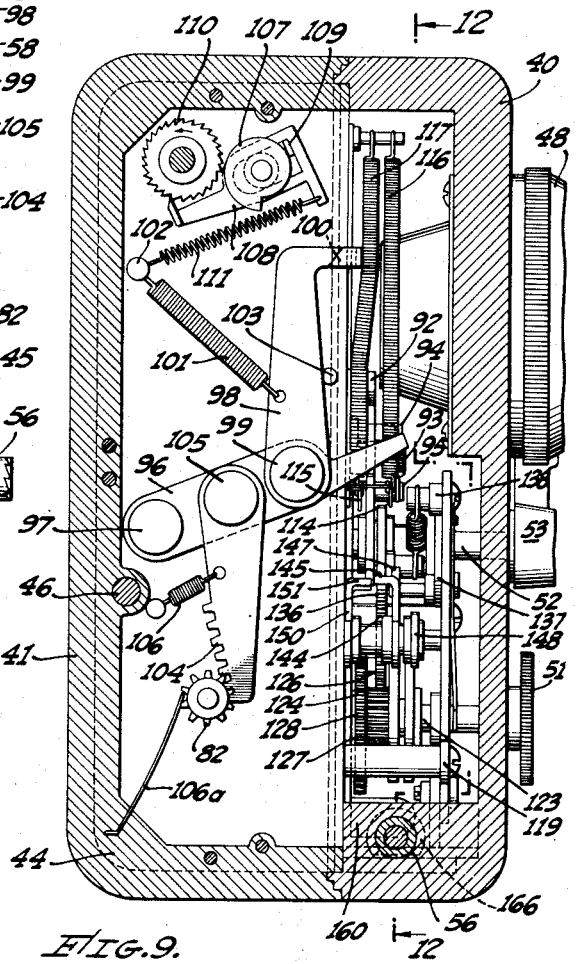
FIG. 9.
FIG. 11.
INVENTOR.
ARTHUR P. NEYHART,
BY
ATTORNEY.

Nov. 28, 1950     A. P. NEYHART     2,531,639
PHOTOGRAPHIC SHUTTER

Filed Dec. 10, 1946     9 Sheets-Sheet 4

INVENTOR.
ARTHUR P. NEYHART,
BY
ATTORNEY.

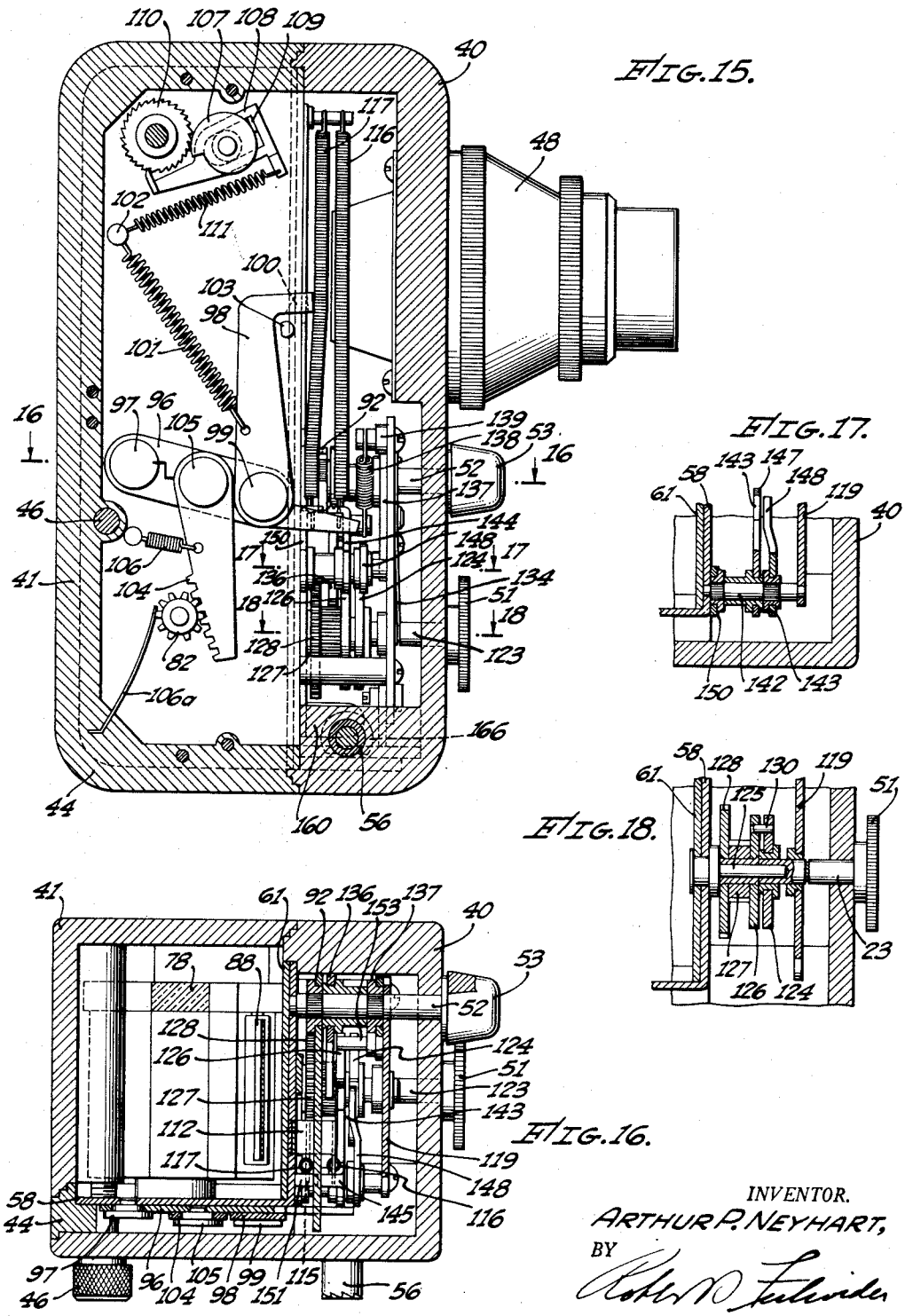

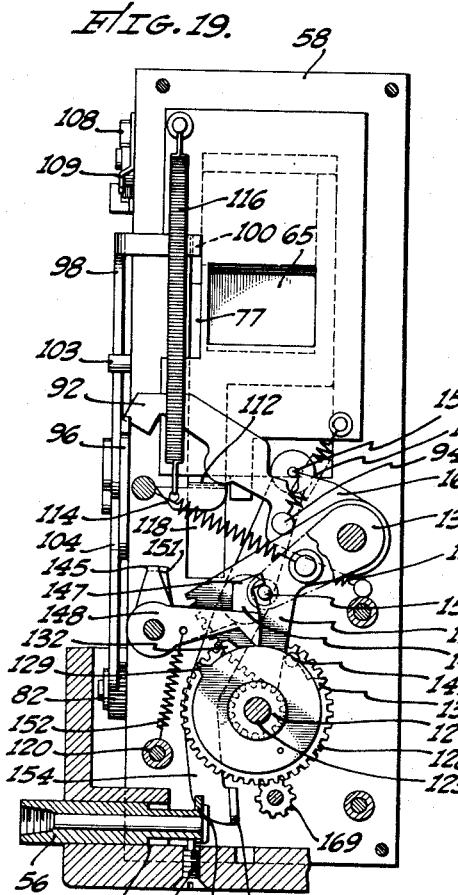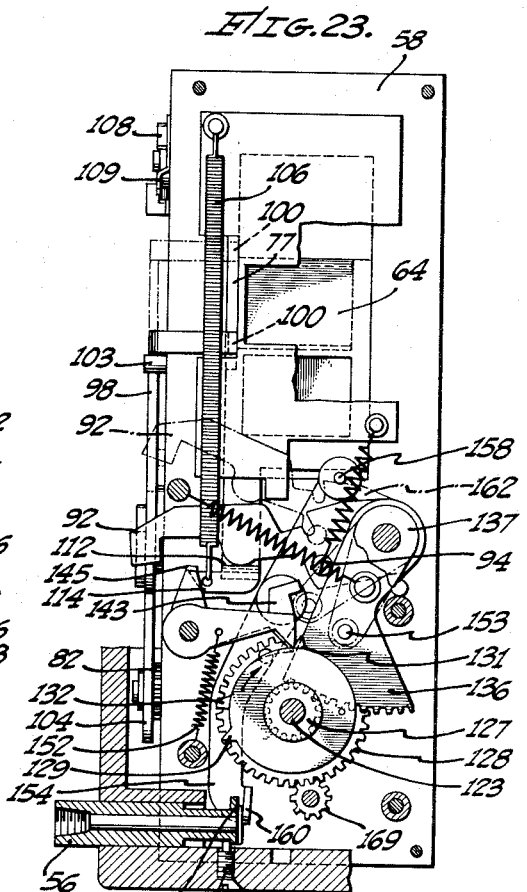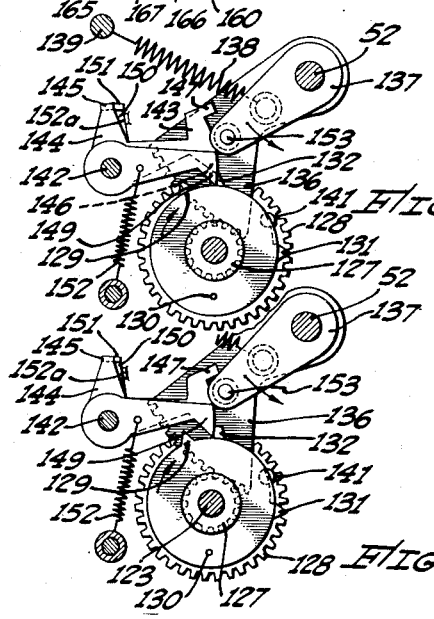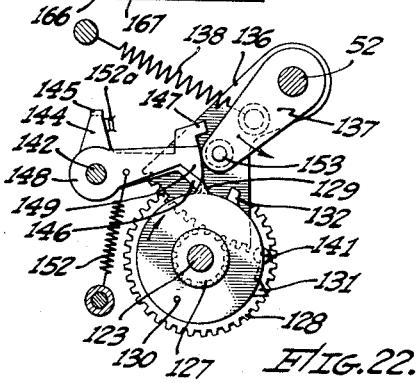

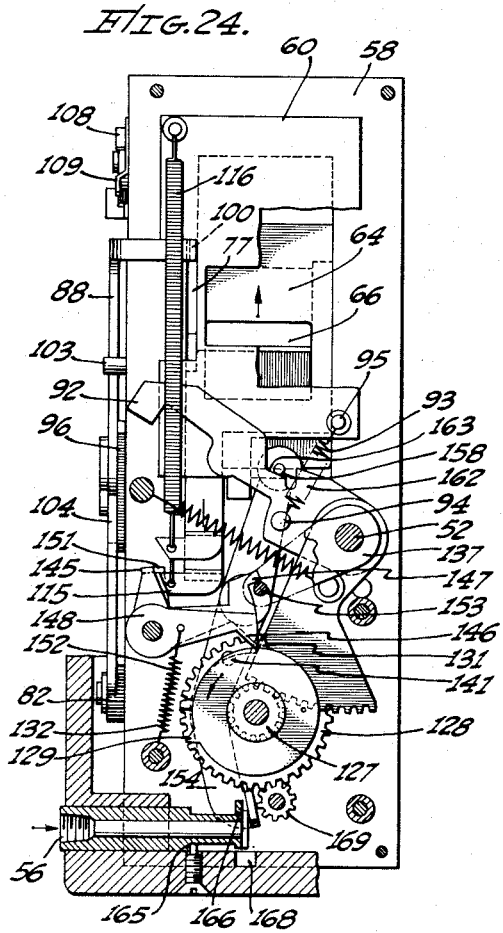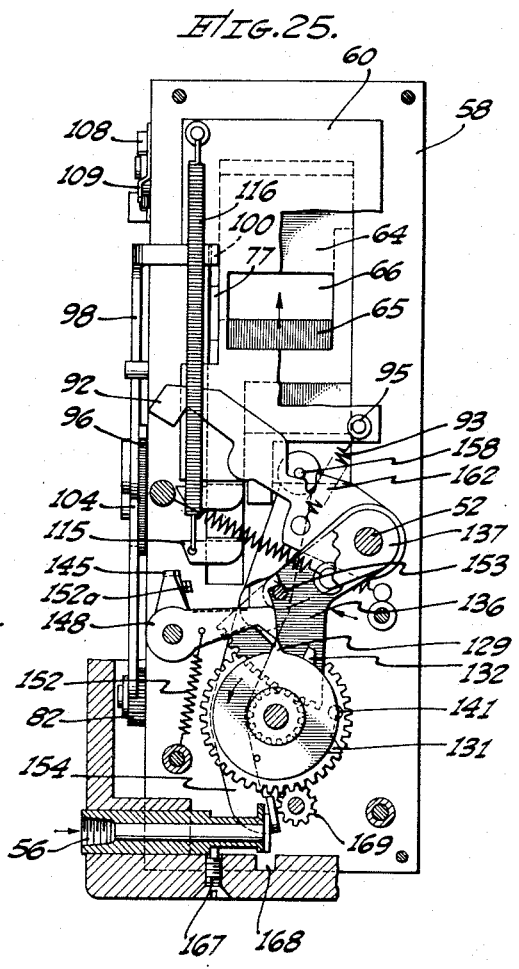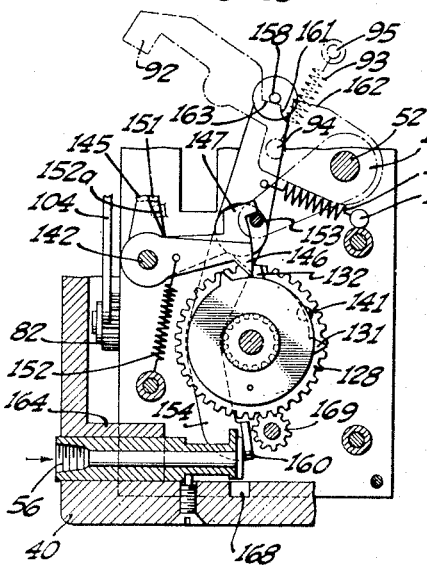

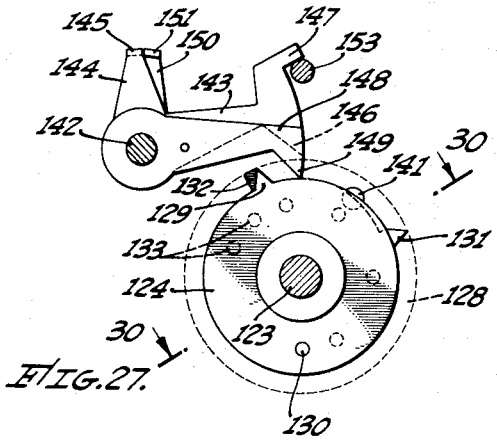
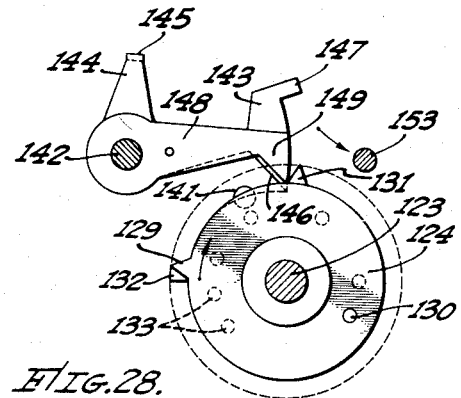
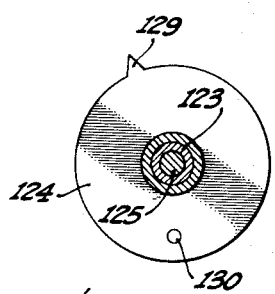
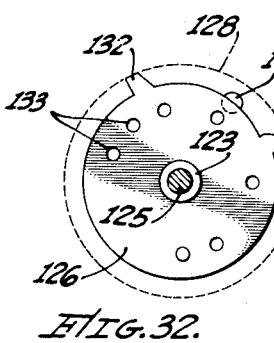
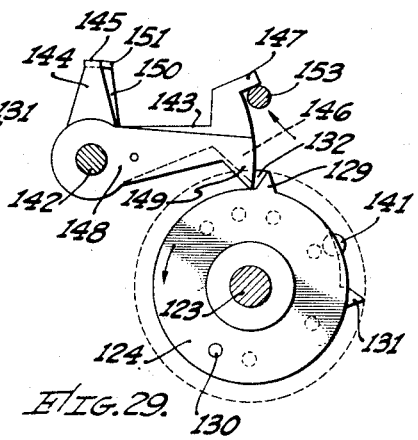
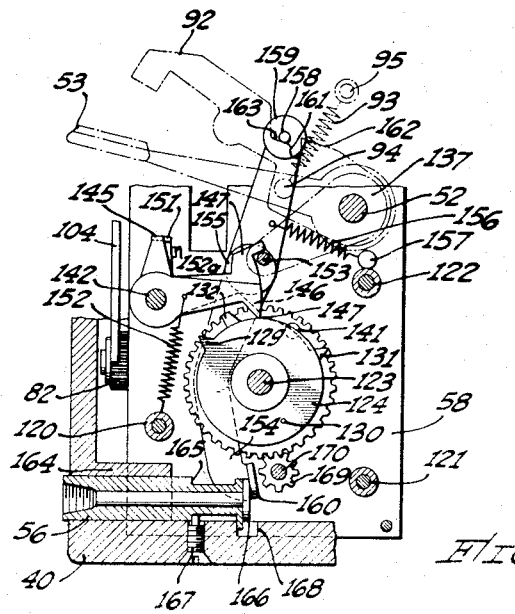
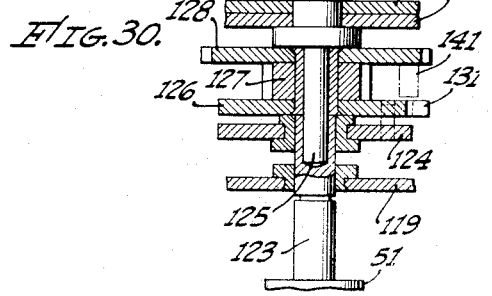
INVENTOR.
ARTHUR P. NEYHART,
BY
ATTORNEY.

Nov. 28, 1950     A. P. NEYHART     2,531,639
PHOTOGRAPHIC SHUTTER

Filed Dec. 10, 1946     9 Sheets-Sheet 9

INVENTOR.
ARTHUR P. NEYHART,
BY
ATTORNEY.

Patented Nov. 28, 1950

2,531,639

UNITED STATES PATENT OFFICE 2,531,639

PHOTOGRAPHIC SHUTTER

Arthur P. Neyhart, Los Angeles, Calif., assignor to Mitex Camera Company, Los Angeles, Calif., a partnership Application December 10, 1946, Serial No. 715,191

12 Claims. (Cl. 95—55)

My invention relates to cameras and more particularly to cameras of the miniature or pocket type having focal plane shutters.

It is desirable, with cameras of this class, to be able to take a large number of photographs in rapid succession, without pausing to wind the film, and without having to reload the camera except at long intervals. This is particularly true when the photographer wishes his actions to be inconspicuous, as in making the so-called candid photographs. Cameras having large magazine capacity and automatic winding are not unknown even among the very small types but they usually require two operations, of cocking and exposing, necessitating the use of both hands. Furthermore, application of the force required to wind the film and to operate the shutters simultaneously frequently results in jarring the camera and blurring the photograph.

It is accordingly an object of my invention to provide a camera in which one manual operation cocks the shutters, and, if desired, releases them.

Another object is to provide that the release of the shutters takes place after release of the force required to cock the shutters, so that the camera is not jolted by a compound release.

A further object is to provide a camera in which the releasing mechanism may be locked in releasing position so that the shutters are released by the return action of the mechanism which cocked them, and the chance of jarring the camera is reduced by the fact that no manually operated means is under increasing pressure at the instant of shutter release.

Still another object is to provide in a small camera means for taking time exposures.

Other objects and advantages will become apparent from consideration of the following description and from the accompanying drawings, in which:

Fig. 8 is a transverse section taken on the line 8—8 of Fig. 6 with the film carriage removed;

Fig. 9 is a vertical section taken on the line 9—9 of Fig. 8;

Fig. 10 is a fragmentary elevation of the upper right side of the camera housing showing the film meter indicator;

Fig. 11 is a fragmentary detail vertical section illustrating some of the actuating means of the film meter indicator, shown at rest in Fig. 9, and here in actuated position;

Fig. 15 is a view similar to Fig. 9, but showing the parts advanced and cocked, and with the cocking lever ready to be returned to its normal position;

Fig. 16 is a horizontal section taken on the line 16—16 of Fig. 15, and is similar to Fig. 14 except for the advanced and cocked position of the parts;

Fig. 17 is a fragmentary horizontal section through the pawl system taken on the line 17—17 of Fig. 15;

Fig. 18 is a fragmentary horizontal section through the cam and gear assembly taken on the line 18—18 of Fig. 15;

Fig. 19 is a schematic illustration of the parts shown in Fig. 13 and shows completion of the initial or slack-removing movement of the parts toward their cocked position;

Fig. 20 is a schematic view of a portion of Fig. 19 showing further advance of the pawl and cam system, with arrows denoting the direction of movement;

Fig. 21 is a view similar to Fig. 20 in a further advanced position;

Fig. 22 is another view similar to Figs. 20 and 21, and is a further advanced but still intermediate position;

Fig. 23 is a diagrammatic schematic illustration of the parts shown in Fig. 19, but advanced and cocked in the positions illustrated in Figs. 15 and 16;

Fig. 24 is a schematic illustration of the position assumed by the operating parts at the instant that they have been uncocked by movement of the actuating plunger;

Fig. 25 is a view similar to Fig. 24 showing further movement of the operating parts subsequent to their release;

Fig. 26 is a schematic view similar to Figs. 24 and 25, with the parts moved still further in the releasing cycle and just prior to re-attaining the initial, inactive position of Fig. 13;

Fig. 27 is a further enlarged schematic illustration of the cams as they would appear in their initial position, but adjusted to make a time exposure;

Fig. 28 is a view similar to Fig. 27, with the parts shown advanced to their cocked position;

Fig. 29 is a view similar to Figs. 27 and 28 showing the parts in the position assumed during a time exposure, after they have been uncocked and before the actuating plunger is released;

Fig. 30 is a horizontal section taken on the line 30—30 of Fig. 29, but the timing cam has been turned as it would be for a snap-shot to bring the connecting pin into view;

Fig. 31 is an elevation of the timing cam in the position shown in Fig. 27;

Fig. 32 is an elevation of the primary cam in the position shown in Fig. 27;

Fig. 33 is a diagrammatic elevational view of the camera parts illustrating an alternative means of making snap-shots with the actuating plunger locked in;

Figure 1:
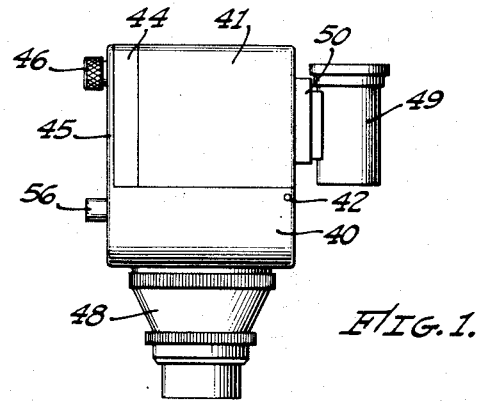
Fig. 1 is a top plan view of an improved camera.
Figure 4:
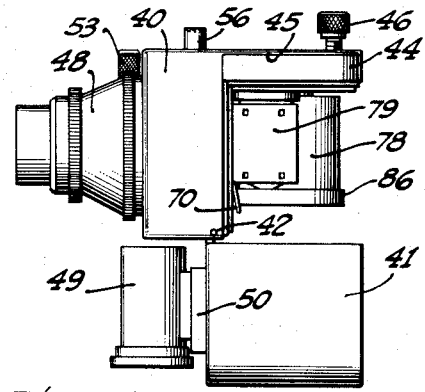
Fig. 4 is a top plan view showing the housing opened to disclose the film carriage.
Figure 2:
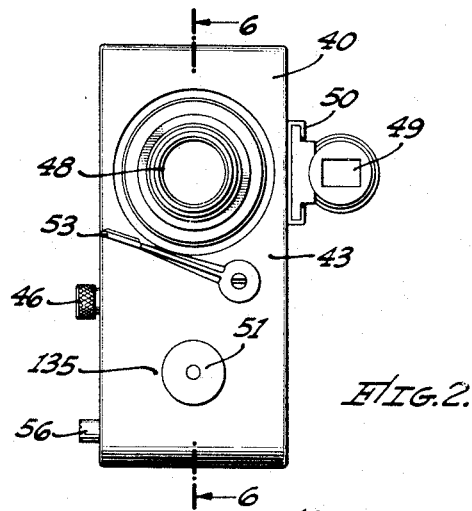
Fig. 2 is a front elevation showing the cocking or control handle and exposure adjustment indicator.
Figure 3:
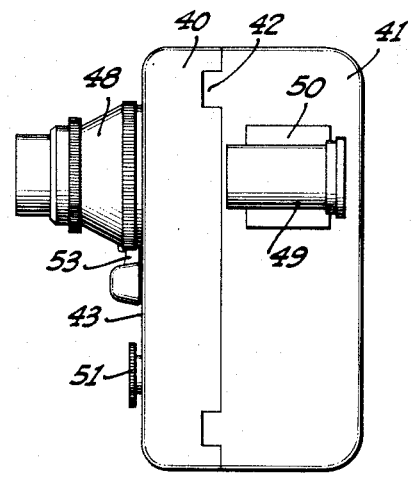
Fig. 3 is a side elevation from the left of the camera showing the divided housing in closed position.
Figure 5:
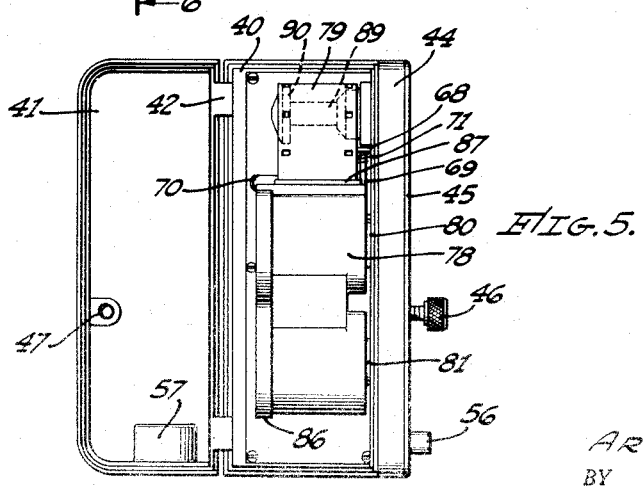
Fig. 5 is a rear elevation of the camera in the open position of Fig. 4.

Throughout the following description, the terms right and left denote the location of camera parts when the camera is held in normal photographing position with the lens pointed away from the photographer. The terms clockwise and counterclockwise refer to movement of parts as they are viewed in Figs. 19 to 26.

Considering now the drawings in detail, and more particularly Figs. 1 to 5, the numeral 40 indicates a housing for the working parts of the camera having a door 41 hinged thereto on hinges 42. Housing 40 forms the front wall and the right-hand wall of the camera casing, the front wall 43 having upper, lower, and left-hand flanges turned inwardly to meet corresponding flanges on the door 41. The door 41 has the shape of a half box and forms the larger part of the left-hand and rear walls of the camera casing, and of the top and bottom walls. A light lock 44 is interposed between the right-hand wall 45 of the housing 40 and the rear wall of the door 41, with stepped or rabbeted edges, as is usual in such devices, to engage corresponding edges in the door 41. The light lock is fastened to the housing 40 by suitable screws, and the housing, light lock and door 41, are all held together in their closed position by a knurled-headed screw 46 which passes through the housing and light lock and is threaded into a lug 47 on the inside of the rear wall of the door 41. Edges of the upper and lower flanges of the housing 40 are also rabbeted, where they meet the edges of door 41.

A lens 48 of any suitable type is mounted on the front wall 43 of the housing 40 and a finder 49 is detachably carried in slides 50 on the left-hand wall of the door 41. The front wall 43 is also perforated to allow passage of the shaft of the exposure adjustment indicator 51, and to allow passage of the shaft 52 of a control handle 53. The right-hand side wall 45 has an inlaid plate 54 (Fig. 10) marked with numbers indicating the number of frames of film that have been exposed and is perforated to allow passage of the shaft of the film meter indicator 55, and of the actuating plunger 56. The bottom wall of the door 41 has a lug 57 on its inner side, which has a threaded bore extending from the outer side to receive the post of a tripod or other mounting means.

Turning now to Figs. 6 to 9, a support frame 58 consisting of a plate bent at a right angle, is mounted within the camera, with one of its angled members attached to the flanges of the front wall 43 and the other to the light lock 44 and thereby to the right-hand wall 45, the flanges and light lock thus serving as spacers to hold frame 58 in position to allow mounting of the operating mechanism between the members of the frame and the walls of the camera. The frame itself serves also as a screen to prevent light which might infiltrate through the various orifices hereinbefore mentioned from entering the film chamber. The frontal member of frame 58 supports the shutters and the operating mechanism therefor, including the time exposure control mechanism, and the side member of the frame supports the film magazine and the film advancing and metering mechanisms to be presently described in detail.

Figure 36:
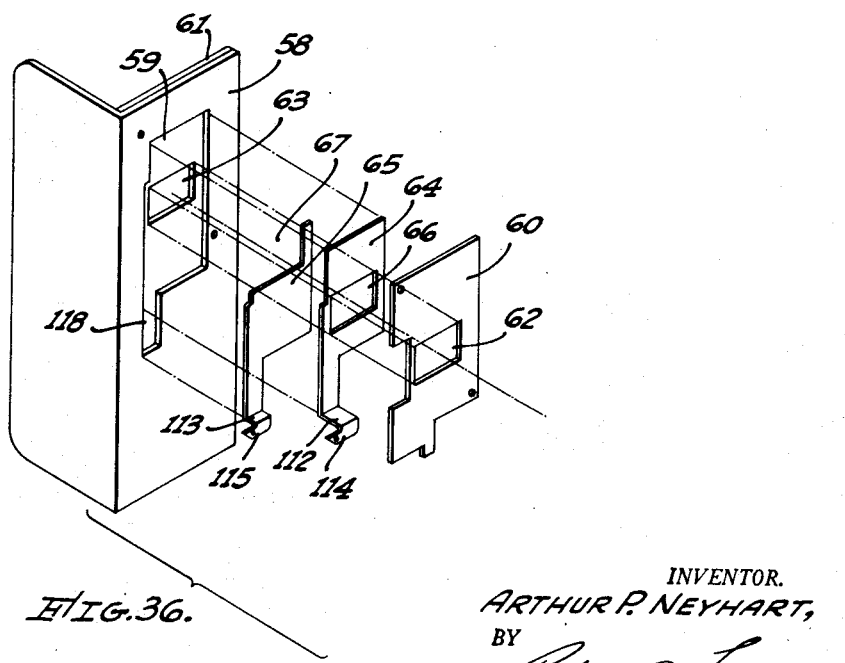
Fig. 36 is a view similar to Figs. 34 and 35 showing the aperture shutter actuated to make an exposure.

The frontal member of frame 58 has a large orifice 59 (best seen in Figs. 34 to 36) in that portion directly rearward of the lens 48, this orifice being closed by a shutter-guiding plate 60 on the outer side of the frame and a film-guiding plate 61 on the inner side thereof except for an opening of the size and shape of a frame of film formed by the registration of orifices 62 and 63 in plates 60 and 61, respectively. Mounted within the orifice 59 and guided slidably therein by the sides thereof and by plates 60 and 61 are two shutters 64 and 65, which may be termed, respectively, the aperture shutter and the cutoff shutter, the outer shutter 64, next to the plate 60, having an aperture 66 cut centrally and the inner shutter 65, next to the plate 61 being a blank except for a cut-away portion 67. The aperture 66 and the cut-away portion 67 may be made to register with orifices 62 and 63 to expose a frame of film, the exact manner of causing and controlling such registration being described herein in connection with the operating and timing mechanism therefor.

Plate 61 covers substantially all the inner side of the frontal member of frame 58 except for a section adjacent the side member thereof at the level of the orifice 63, at which point it is cut to form two tabs 68 bent at right angles to the plate and acting as bearings for the shaft 69 of a pressure plate 70, shown in Fig. 8, held in place by a spring 71 and having the usual fingernail tab on its free end. Shallow channels stamped in the outer face of plate 61 form low ridges 72 and 73 on the inner side thereof to hold the sensitized face of the film from scraping on the plate, and also form lugs 74 to guide the left-hand edge of the film. A roller 75 is mounted loosely on the frontal member of frame 58, having a bore larger than its supporting pin and being urged to the left by a leaf spring 76 mounted on the side member of the frame so that it resiliently guides the right-hand edge of the film. A slot 77 in the plate 61, in register with the right-hand edge of the orifice 59, is also in register with the marginal perforations of the film and with a recess in the edge of plate 60, and permits access to the perforations by the film-moving mechanism located in front of plate 60.

Figure 6:
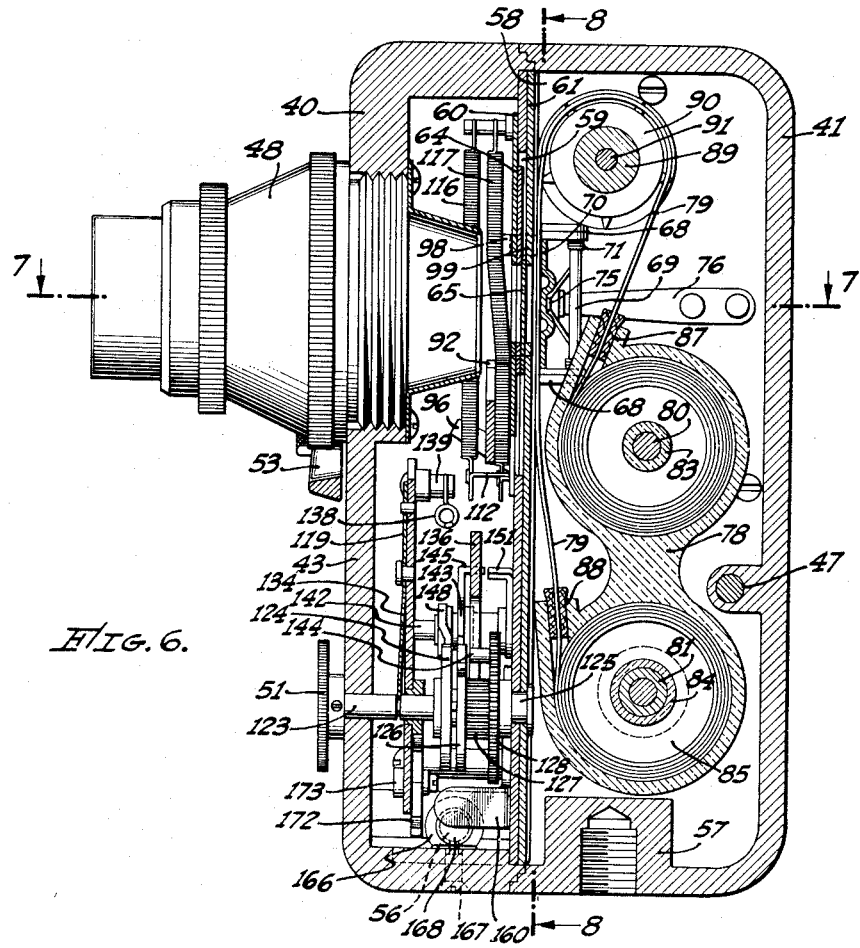
Fig. 6 is an enlarged vertical section taken on the line 6—6 of Fig. 2, giving a side view of the operating mechanism in its initial or inactive position.
Figure 7:
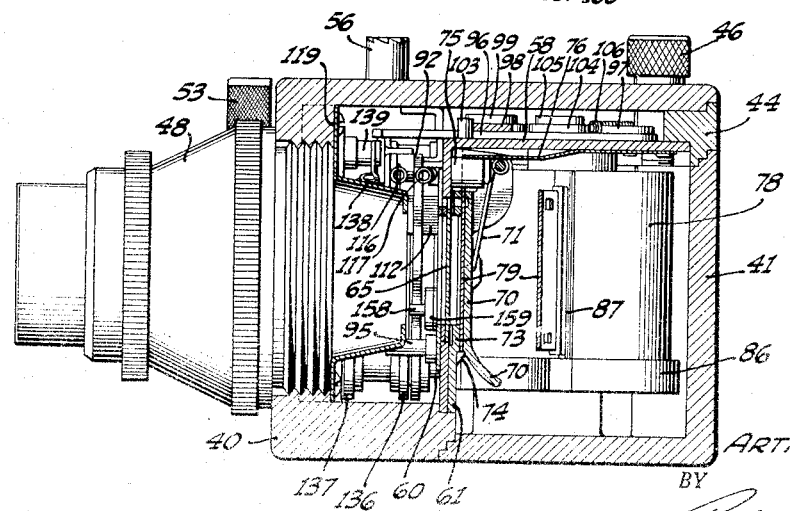
Fig. 7 is a horizontal section taken on the line 7—7 of Fig. 6.
Figure 12:
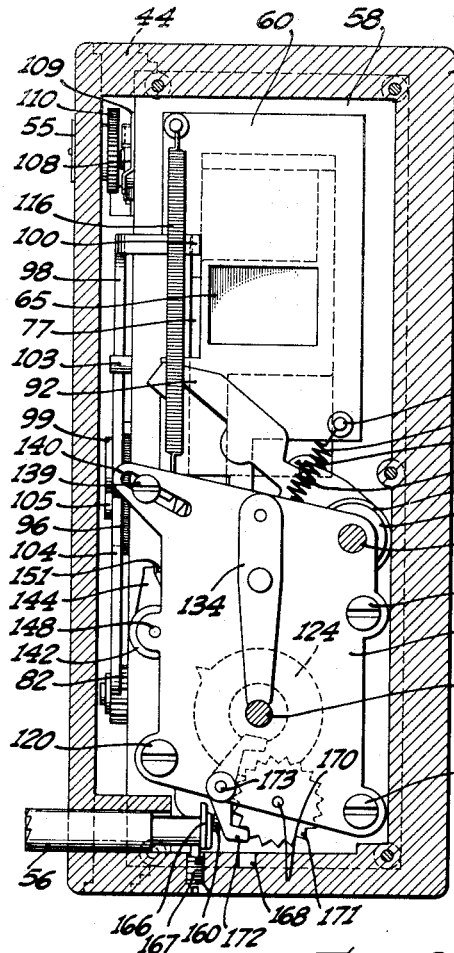
Fig. 12 is a transverse sectional view taken on the line 12—12 of Fig. 9, giving a frontal view of the mechanism in its initial position.

The side member of frame 58 supports the film carriage 78 in which the film 79 is held. For this purpose a pin 80 is set in frame 58 near the center of the side member, with a splined shaft 81 below it. Splined shaft 81 extends through the side member and carries a frictionally mounted pinion 82 on its outer end. The film carriage 78 has upper and lower cylinders with integral end closures on the ends adjacent the frame 58, with the upper closure carrying a hollow shaft 83 into which the pin 80 fits and the lower closure forming a bearing for a trunnion 84 of a winding spool 85, as shown in Fig. 6. The splined shaft 81 fits within the bore of the winding spool 85 which is adapted to engage the splines. The spool ends of the winding spool 85 fit revolubly in the lower cylinder, keeping the spool in alignment therewith. A double cap 86, shown in Fig. 7, closes the ends of the cylinders away from the frame 58 and nearest the door 41. Slot ports 87 and 88, fitted with soft cloth linings to exclude light and to prevent scratching, permit the film to be pulled out of the upper cylinder and to be wound into the lower cylinder. The upper port 87 is inclined slightly rearwardly to cause a loop of film to bow in that direction. Above the film carriage mounting, the side member of frame 58 carries a hollow pin 89 having a wide shoulder adjacent the frame and a shaft 91 extending therethrough, with the end of the shaft extending beyond the pin and carrying a sprocket wheel 90 having teeth adapted to engage the marginal perforations of the film, as shown in Fig. 6 and in dotted lines in Fig. 5.

It will be seen that film carriage 78 may be readily withdrawn from the pin 80 and the splined shaft 81, its cap 86 removed, and a roll of film 79 placed in the upper cylinder. When the end of the film is threaded outwardly through port 87 and back into the lower cylinder through port 88 and gummed or otherwise engaged with the spool 85, and the cap 86 replaced, the carriage and film are ready for insertion in the camera. As the carriage, so made up, is completely light proof, the photographer may carry a number of these carriages ready for immediate use. When the carriage has been placed upon its supporting pin 80 and shaft 81, it is only necessary to pass a loop of film around pin 89, engaging the perforations of the film with the sprocket wheel 90, and placing the forward segment of the loop under the pressure plate 70 and between the lugs 74 and the roller 75. The rearward inclination of the port 87 will hold the loop in engagement with the sprocket, even though an excess of film may have been unwound.

The film advancing and metering mechanism, now to be described with particular reference to Figs. 8 to 15, is moved in advancing direction by means of an actuating arm 92 mounted on the shaft 52 of the control handle 53. Arm 92 is normally held in an elevated position by a spring 93 carried between a pin 94 on the arm 92, and a pin 95 on the frontal member of the frame 58. Depression of the control handle 53 causes the free end of the arm 92, which is slightly hooked for this purpose, to engage the end of a lever 96 pivotally mounted on the side member of the frame 58 by a shoulder pin 97. Lever 96 carries a film feed bar 98 pivoted thereon by a shoulder pin 99. The upper end of film feed bar 98 projects forwardly and is bent around the angle of the frame 58 and rearwardly again so as to pass through the slot 77. The end of the bar passing through the slot is bevelled to a downwardly inclined point or dog as shown in dotted lines at 100 in Figs. 9 and 15 so as to engage the marginal perforations of the film with its flat lower side on the down-stroke of the bar, and to be moved out of said perforations by the contact of its bevelled upper side with the upper margin of the slot 77 which limits the up-stroke. This outward position permits the insertion and removal of the film without tearing. A spring 101, connected to a pin 102 on the side member of frame 58, urges the transversely bent portion of the bar into contact with the frontal member of the frame 58 and engages the dog 100 with the film perforations at the beginning of the downstroke. A pin 103 holds the bar from swinging forward and thus prevents the dog 100 from camming itself out of the slot 77. A rack 104, pivoted on a shoulder pin 105 on the lever 96, is urged by a light coil spring 106 into engagement with the pinion 82 which, it will be recalled, is frictionally mounted on the end of the shaft 81 of the winding spool 85. By comparison of Figs. 9 and 15 it will be seen that the rack is thrust into the teeth of the pinion on the down-stroke but lifted away from them on the up-stroke with a sawing motion which causes the rack to engage lightly with the teeth in the first-named motion but to disengage and to slide over them on the second motion. To positively prevent reverse movement of the pinion, a spring pawl 106a set in the light lock 44, engages the teeth of the pinion on the side thereof opposite to the rack. The reciprocating action of the film feed bar 98, advances the film, moving it one frame with each full downstroke, and the winding spool 85, which is rotatably urged by the pinion 82, merely winds up the exposed film without strain. As will presently be shown, the film feed bar does not return to a position permitting the dog to engage the film perforations until the shutters have been moved to expose the film and therefore if the control handle is again by chance moved down before such exposure is made, the film feed bar is inoperative and the friction of the pressure plate 70 upon the film will hold the film in place with the rack 104 rotating the pinion 82 on the shaft 81, the frictional mounting of the pinion acting as a torque-limiting means to prevent the film's being moved by the winding spool.

As the film passes over the sprocket wheel 90 with the perforation of each frame engaging a tooth, it causes that wheel to rotate the shaft 91, upon the other end of which, and outside the side member of the frame 58, is a cam 107, as shown in detail in Figs. 9, 10, and 11. A pawl 108 is mounted on the shaft 91 between the cam 107 and the frame 58 with a slot permitting it to move transversely to the shaft as well as to rotate about it. A part of the material from the slot is bent to form an ear 109 in the path of the cam. The tooth of the pawl is bent outwardly to lie in the path of and engage a ratchet wheel 110 carried on the inner end of the shaft bearing the film meter indicator 55. A spring 111, which may be attached to pin 102, engages a lateral arm of the pawl and urges the pawl towards the ratchet wheel 110 both longitudinally and rotatively to maintain contact therewith and to maintain the ear 109 in contact with the cam 107. The sprocket wheel 90 has five sprocket teeth, so that the wheel and the cam make one revolution for each five frames. On each revolution the cam presses against the ear 109 to move the pawl to the right and to move the ratchet wheel counterclockwise by one tooth. As the shoulder of the cam passes the ear, the spring 111 moves the pawl back to the left into engagement with another tooth. The ratchet wheel moves the film meter indicator 55. The camera may be adapted for films of various length but for example is illustrated as adapted for one hundred frames. It will be noted from Fig. 10 that the numbers on the indicator plate 54 are spaced to leave a gap between 0 and 100, instead of having 0 and 100 coincide. This gap, which is the equivalent of twenty frames, or four teeth of the ratchet wheel, allows for winding the unsensitized ends of the film. Thus, for a film of one hundred frames, the ratchet wheel would have twenty-four teeth instead of twenty.

The arm 92 which actuates the film moving mechanism also serves to move the shutters 64 and 65 into a tensioned position from which they may subsequently be released to cause an exposure of the film. Both of the shutters have slightly offset marginal downward extensions bent forwardly to form, respectively, upwardly faced shoulders 112 and 113, and then downwardly again, with lateral projections having inclined lower faces to form latches or detents 114 and 115. The marginal extension and the shoulder 113 of the rearward cut-off shutter 65 are proportioned so that the shoulder 113 may underlie the shoulder 112 of the forward aperture shutter 64. Springs 116 and 117, attached to the frame 58, engage the detents 114 and 115 and urge the shutters upward. The orifice 59 has a slightly offset marginal slot 118 to accommodate the vertical movement of the downward extensions of the shutters, the lower edge of this slot limiting the downward movement while the lower edge of the plate 60 limits the upward movement. When the control handle 53 is pushed down, a rounded shoulder on the lower side of the arm 92 comes in contact with and pushes down the shoulder 112 which in turn pushes down the underlying shoulder 113, so that both shutters are moved together against the tension of the springs 116 and 117 to the position shown in Fig. 23 and schematically shown in Fig. 35. Because of the underlying position of the shoulder 113, it will be noted that the cut-off shutter 65, of which it is a part, must stay down until the aperture shutter 64 goes up, but that the latter may go up leaving the former down.

The mechanism for temporarily holding the shutters cocked in the aforesaid position is interrelated with the timing mechanism and these two mechanisms will now be described together. A foreplate 119 to support and protect these mechanisms is supported on the frontal member of frame 58 by posts 120, 121, and 122. A shaft 123, which carries on its outer end the exposure adjustment indicator 51, is slidably journaled in the plate 119 as shown in Figs. 18 and 30 and has a hollow portion extending inwardly therefrom carrying a timing cam 124, shown individually in Fig. 31. Another shaft 125, supported by frame 58 and slidable in the hollow portion of shaft 123, carries in inward succession a primary cam 126, illustrated in Fig. 32, a pinion 127, and a gear 128. The timing cam 124 is circular except for a projection or lifting lug 129 formed to urge outward movement of, but not catch against, an obstruction. The cam 124 also supports a pin 130 directed inwardly toward the primary cam 126. Cam 126 has a lifting lug 131 shaped like the lug 129 and a lug 132 having a sloped face and a radial face and spaced at about ninety degrees in a counterclockwise direction from the lug 131, the cam edge between these lugs being cut down to provide a slight radial shoulder at the base of lug 131. Cam 126 has a plurality of holes 133 adapted to receive the pin 130. A forked leaf spring 134, shown in Fig. 12, supported on the fore-plate 119, straddles a groove in the shaft 123 and urges the shaft and the cam 124 carried thereon toward the cam 126. By pulling outwardly on the exposure adjustment indicator 51 and then releasing it, the pin 130 may be selectively placed in any of the holes 133, the indicator dial then registering an appropriate mark against a mark 135 shown in Fig. 2.

The shaft 52 of the control handle 53 supports a segmental gear 136 freely pivotable thereon and also a lever 137 splined to the shaft to rotate in unison with, but at a divergent angle from, arm 92. The segmental gear 136 engages the pinion 127 and lies in the path of the spring-holding pin 94 on the arm 92, which thus imparts counterclockwise motion to the segmental gear and clockwise rotation to the cams 126 and 124 and the gear 128 when the arm 92 is moved downwardly by the control handle 53. A spring 138, carried between the segmental gear 136 and a bolt 139 adjustably mounted in a slot 140 in the fore-plate 119, urges the segmental gear in a clockwise direction, as seen for example in Figs. 12 and 13, and thereby urges the pinion 127 and the cams 124 and 126 in a counterclockwise direction.

A pin 141 in the gear 128 lies in the path of the segmental gear 136, and as it is set further out on the gear than the teeth of the pinion 127, it overtakes the segmental gear when it is moved counterclockwise, thereby stopping movement of the gear and of all the associated parts mounted on the shafts 125 and 123 and preventing the segmental gear from disengaging with the pinion 127 under the urging of the spring 138. It will be seen that the segmental gear 136, spring 138, and the parts mounted on the shafts 125 and 123 constitute a spring motor which is wound by movement of the control handle 53 acting through the arm 92 and unwound by the tension of the spring 138 until stopped by the pin 141, the spring 93 serving to move the pin 94 out of the way of the returning segmental gear. As the tension of the spring 138 is adjustable by the position of the bolt 139, this one adjustment governs the strength of the spring motor. Stopping the unwinding of the motor by means not connected with the arm 92 and therethrough to the handle 53 permits a slight amount of free movement of the handle and arm against only the tension of the spring 93. This is desirable in producing a smooth feeling action and avoiding muscular reflexes.

To connect the shutters 64 and 65 with the above described spring motor and to cock the shutters and the motor in tensioned position, I provide a pair of pawls mounted on a shaft 142 journaled in the fore-plate 119 and the frame 58, the method of mounting being shown in Fig. 17, and the pawls themselves being most clearly seen in Figs. 27, 28, and 29. One of the pawls, 143, is mounted to rotate freely on the central portion of the shaft 142, in alignment with the double-lugged cam 126. This pawl has an arm 144 which extends upwardly from the pivoted portion of the pawl and terminates in a lateral projection which forms a right-angled hook 145 extending rearwardly. A second arm of this pawl extends in the direction of the cam 126, and terminates in a downwardly directed tooth 146 and an upwardly inclined finger 147. The second pawl 148 is splined to the shaft 142 so as to rotate therewith and is in alignment with the single-lugged cam 124, being offset slightly to permit an adequate length of splining on the shaft. This pawl 148 terminates in a downwardly directed tooth 149, both of the teeth 146 and 149 being adapted to make contact with their respective cams at the top of the cam cycle. Also splined to shaft 142, adjacent the frame 58, is an arm 150 similar to the upwardly extending arm 144 of the pawl 143, having a hook 151 which is bent forwardly, this hook and the hook 145 of the arm 144 thus being turned toward each other. It will be seen that the pawl 148 and the arm 150, being splined at opposite ends of the shaft 142, operate in the same unit relationship as the pawl 143 and its integral arm 144, but that the pawl 143 can rotate independently of the pawl 148. Both pawls are independently urged to make contact with their respective cams 126 and 124 by springs attached to the supporting post 120, of which only one is shown at 152 in Figs. 19 to 26. The tooth 146 of the pawl 143 may thus be brought into contact with either the radial face of the lug 132 or the radial shoulder of the lug 131 on the aligned cam 126 preventing counterclockwise, or unwinding movement of this cam and the associated elements of the aforementioned spring motor.

To prevent the pawl 146 from being thrust downward between the cams by its spring 152 when its co-acting cam 124 is pulled out of its path in order to re-set the pin 130 in another of the holes 133, I provide a stop 152a which may be a protrusion pressed in the frame 58 in the path of the arm 150. As arm 150 and pawl 146 rotate in unison, this stop limits the rotation of pawl 146.

When the arm 92, as herein previously described, winds the spring motor and simultaneously pushes the shutters 64 and 65 downwardly by bearing on the respective shoulders 112 and 113, it brings the respective detents 114 and 115 into contact with the hooks 145 and 151. The lower edges of the detents, being sloped, push the hooks outwardly against the tension of the springs 152, which bring the hooks back into engagement with the upper edges of the detents when the points of the detents have passed below them, thus holding the shutters in their lowered position shown in Fig. 35. The tension of the shutter springs 116 and 117 is now added to that of the springs 152 to hold the teeth 146 and 149 of the pawls 143 and 148 in contact with the edges of the cams 126 and 124; and the detents 114 and 115 will remain caught under the hooks 145 and 151, cocking the shutters, until the pawls are moved in a counterclockwise direction. The primary cam 126 is so positioned on the shaft 125 that the low radial shoulder of the lug 131 is moved just past the tooth 146 of the pawl 143 by the winding of the motor and catches against the tooth as soon as the arm 92 is released, thus cocking the motor. The pawls and the elements forming the spring motor thus constitute a cocking mechanism for the shutters actuated by the same movement of the arm 92 which brings the shutters into their tensioned position and which moves the film advancing mechanism.

The means for releasing the cocking mechanism comprises the lever 137 which rotates with its supporting shaft 52 and with the arm 92 and carries a stud 153 the orbit of which intersects that of the finger 147 of the pawl 143, the angle of suspension of the lever 137 being such that at the lower part of its orbit, the stud 153 will be below the finger 147, and will make contact with it as it rises. When the spring motor is wound, and the shutters are cocked down by the catching of the tooth 146 of the pawl 143 against the radial face of the lug 131 on the cam 126, an upward movement of the stud 153 in contact with the finger 147, such as would coincide with a permitted upward movement of the arm 92, will move the finger upward and cause the tooth to disengage from the lug, thereby permitting the spring motor to begin unwinding. The sloped face of the lug 131 will then cam the tooth 146 further upward, causing sufficient counterclockwise movement of the pawl 143 to make the hook 145 release the detent 114 of the aperture shutter 64 and permit that shutter to rise, allowing light from the lens to pass through the aperture 66 of that shutter and through the cut-away portion 67 of the shutter 65 to the film. The lug 129 on the cam 124 will follow the lug 131 and will lift the pawl 148, releasing the detent 115 from under the hook 141 and permitting the shutter 65 to rise to cut off the exposure.

To provide for holding the stud 153 out of contact with the finger 147, a trigger 154 operates in connection with the arm 92 and therethrough upon the lever 137. The trigger 154 is pivoted on a shoulder rivet 155 carried by the frame 58, and is urged in a clockwise direction by the tension of a spring 156 connecting it to a pin 157, as seen in Fig. 26. At its upper end it carries a pin 158 set in a boss 159 and extending into the path of the arm 92.

The boss 159 serves as a guide and bearing surface to maintain the unsupported ends of the trigger and of the arm 92 in their proper orbits. At its slower end, the trigger has an outwardly turned ear 160 extending into the path of the plunger 56. On its upper side, the arm 92 has a recess 161 adapted to receive the pin 158, this recess being situated between a higher shoulder 162 in the clockwise direction and a lower shoulder 163 in the counterclockwise direction. When the spring motor is unwound, the pin 158 rests within the recess 161, limiting the upward movement of the arm 92 urged by the spring 93. When the arm 92 is moved downwardly to lower the shutters and wind and cock the spring motor, the pin 158 is moved by the spring 156 to a position above the high shoulder 162 where it limits the re-elevation of arm 92 to an intermediate position. When, by pressure of the plunger 56, the trigger 154 is rotated in a counterclockwise direction, the pin 158 jumps the recess 161 and rests upon the low shoulder 163. In this position it permits further upward movement of the arm 92 sufficient to let the lever 137 bring the stud 153 against the finger 147, which causes the unwinding of the spring motor and the release of the shutters as previously described. The motor does not, however, completely unwind as the stud 153 only moves the pawl 143 sufficiently to move the tooth 146 out of the low shoulder of the lug 131 and into the path of the radial face of the lug 132 which catches against it. This action relieves the pin 141 from the strain of having to stop movement of the segmental gear and spring motor when at full speed and prevents both backlash and jamming of the motor parts. It also has an important function in taking time-exposures. When, now, the plunger 56 is released, the trigger 154 is urged by the spring 156 to bring the pin 158 back to the recess 161, allowing full elevation of the arm 92 and the lever 137, and thereby releasing the tooth 146 from the lug 132 and letting the spring motor move the short remaining distance to its original position.

The plunger 56 is carried slidably in a lug 164 within the base of the housing 40 and is of the usual hollow form permitting attachment of a cable or tube for distant operation. The inner end of the plunger is reduced to form an annular shoulder 165 and the inner tip carries an annular flange 166 having one side flattened as shown in Fig. 6. A screw 167 in the base of the housing 40 acts in conjunction with the shoulder 165 and the flange 166 to limit the longitudinal movement of the plunger. A groove 168 in the base of the housing 40 is adapted to receive the wide part of the flange 166 when the plunger is rotated so as to turn that part downward, thereby holding the plunger in its inner or activating position.

An escapement movement effects a timing delay between the release of the aperture shutter 64 and the release of the cut-off shutter 65 in proportion to the spacing of the lugs 131 and 129 as adjusted by the setting of the pin 130 of the timing cam 124 in the holes 133 of the primary cam 126. The gear 128 on the shaft 125 carrying the last-mentioned cam is in driving contact with a gear 169 mounted on a shaft 170 supported between the frame 58 and the fore-plate 119. A toothed wheel 171 (shown in Fig. 12) mounted also on the shaft 170 and rotated thereby, is made to move slowly to the urge of the spring motor by an escapement 172 supported by a pin 173 in the foreplate 119. The spacing of the holes 133 is such as to place the lug 129 on the time delay cam 124 at selective clockwise angles from the lug 131 on the primary cam 126, so that under the urging of the spring 138 as controlled by the delaying action of the escapement 172, the lug 129 will reach the top of the cycle of its cam and release the cut-off shutter 65 at appropriate and calculable fractions of a second after the spring motor has started to unwind and the aperture shutter 64 has been released.

The invention is capable of three modes of operation which will best be understood by comparison of the drawings showing the successive steps of each mode. Figs. 6 to 14 show the interior parts prior to any movement of any of the methods of operation, with Figs. 9 and 13 most easily comparable with those illustrative of later steps. Figs. 19 to 22 illustrate successive movements in the process of moving the film in position for a new exposure and cocking the shutters. Figs. 15 to 18, and Fig. 23 show the mechanism in the cocked and ready position. Figs. 24 to 26 show the mechanism in successive steps after the actuation of the trigger in the usual method of making snapshots. Fig. 33 illustrates the initial position in a second method of making snapshots, with the rest of the cycle carried out as in Figs. 19 to 26. A method of time-exposure is shown in Figs. 27 to 32.

Figure 13:
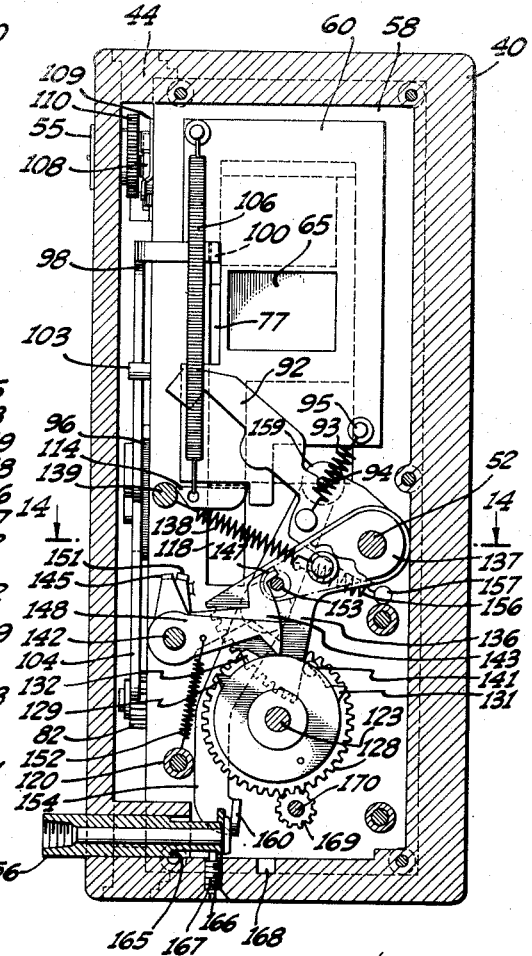
Fig. 13 is a view similar to Fig. 12 with the foreplate removed and the parts so disclosed shown in elevation.
Figure 14:
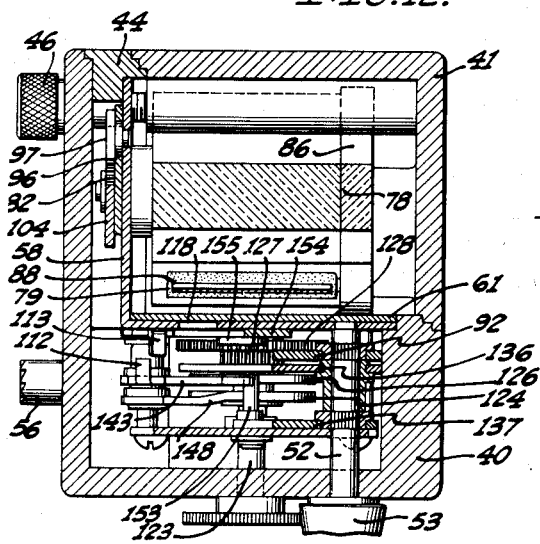
Fig. 14 is a horizontal section taken on the line 14—14 of Fig. 13, illustrating particularly the detail of the parts which are mounted on the control handle shaft.

Beginning with the usual method of making snapshots it will be assumed that the photographer has already inserted a film carriage as hereinbefore described and has set the exposure adjustment indicator 51 at a desired point which, for example, might bring the lug 129 on the time delay cam 124 to a position corresponding to approximately ten o'clock on the cam cycle as shown in Fig. 13. To bring a new frame of film into position and to cock the shutters, the photographer presses the control handle 53 down to the fullest extent and then releases it. The downward movement of the control handle moves the arm 92 and the lever 137. At the beginning of this movement it will be seen by comparing Fig. 19 with Fig. 13 that the arm 92 has moved downwardly until the rounded shoulder thereof has made contact with the shoulder 112 of the aperture shutter 64 and has moved the shoulder 112 and the shoulder 113 beneath it slightly away from the top of the slot 118 in the frame 58. The spring pin 94 has come into contact with the segmental gear 136 but has not begun to move it, as can be seen from the position of the pin 141 which is still against the segmental gear and indicates that the elements on the shaft 123 have not yet been moved. The lever 137 with its stud 153 has rotated with the control handle 53 sufficiently to let the pawl 143 move down into contact with the primary cam 126, bringing the hook 145 more in line with the hook 151. The recess 161 has moved downwardly away from the pin 158 of the trigger 154, and the spring 156 is urging the pin to a position above the high shoulder 162 of the arm 92.

Further rotation of the handle 53 produces the sequence of movement of the pawls and cams shown in Figs. 20 to 23. In Fig. 20, the segmental gear 136, moved by the pin 94 (not shown) has begun to move the elements on the shaft 123 in a clockwise direction, and the lug 132 has lifted the pawl 143 so that it no longer bears on the stud 153. An instant later, as viewed in Fig. 21, the pawl 143 has fallen behind the lug 132 and is in contact with the edge of the primary cam 126. At another instant later, Fig. 22 shows the tooth 149 of the pawl 148 raised by the lug 129 on the time delay cam 124. At the end of the movement, as shown in Fig. 23, the clockwise movement of the cams has brought the lug 131 on the primary cam 126 to the top of the cam cycle. Just prior to this view, the downward pressure of the arm 92 has brought the detents 114 and 115 into contact with the hooks 145 and 151, pushing these hooks momentarily outward and raising the pawls from the cams. The detents having passed below the hooks, the springs 152 pull the pawls down again, hooking the hooks 145 and 151 over the detents and catching the tooth 146 of the pawl 143 behind the radial shoulder of the lug 131. The spring motor is thus wound and cocked and the shutters are held down in the position shown in Fig. 35. The tension of the shutter springs 116 and 117 is now added to that of the springs 152 to hold the pawls in contact with the cams, and the detents will remain caught under the hooks, thus cocking the shutters until the pawl 143 is released. The handle 53 may therefore be released, allowing the arm 92 to move upwardly to the position shown in dotted lines in Fig. 23, where it is caught by the pin 158 bearing upon its high shoulder 162. Re-releasing of the shutter allows the lever 137 synchronously to move to the position also shown in dotted lines in Fig. 23 with the stud 153 just out of contact with the finger 147 of the pawl 143. It should be noted that this movement of the arm 92 moves the pin 94 entirely away from the segmental gear 136 leaving the motor cocked by the cam and pawl, and the segmental gear free to move with subsequent unwinding of the motor.

During the above-described downward rotation of the handle 53, the hooked end of the arm 92 has made contact with the end of the lever 96 and has pushed the lever down, causing the dog 100 on the film feed bar 98 to move down through the slot 77 and to pull a new frame of film into position for exposure. When the arm 92 is released to the position shown in dotted lines in Fig. 23, the film feed bar is moved upwardly again by the spring 101 (Fig. 15), the dog 100 disengaging from the marginal perforations of the film because of its inclined upper edge. However, as the pin 158 still holds the arm 92 partly down by contact with the high shoulder 162, the arm in turn remains in contact with the lever 96 and allows the dog 100 to attain only the position shown in dotted lines in Fig. 23, a little below the upper limit of the slot 77, where it cannot engage another perforation in the film. By this interaction between the shutter-cocking mechanism, the shutter releasing mechanism and the film advancing mechanism, it is not only impossible to cock the shutters in preparation for taking a picture without moving new film into place so as to avoid a double exposure, but it is impossible, once the shutters have been cocked, to move new film into place until the shutters have been uncocked and the picture taken, thus avoiding accidental waste of film.

The downward and upward movement of the film feed bar 98 will have moved the film meter indicator 55 and the winding spool 85 in the manner already described.

Figures 34, 35:
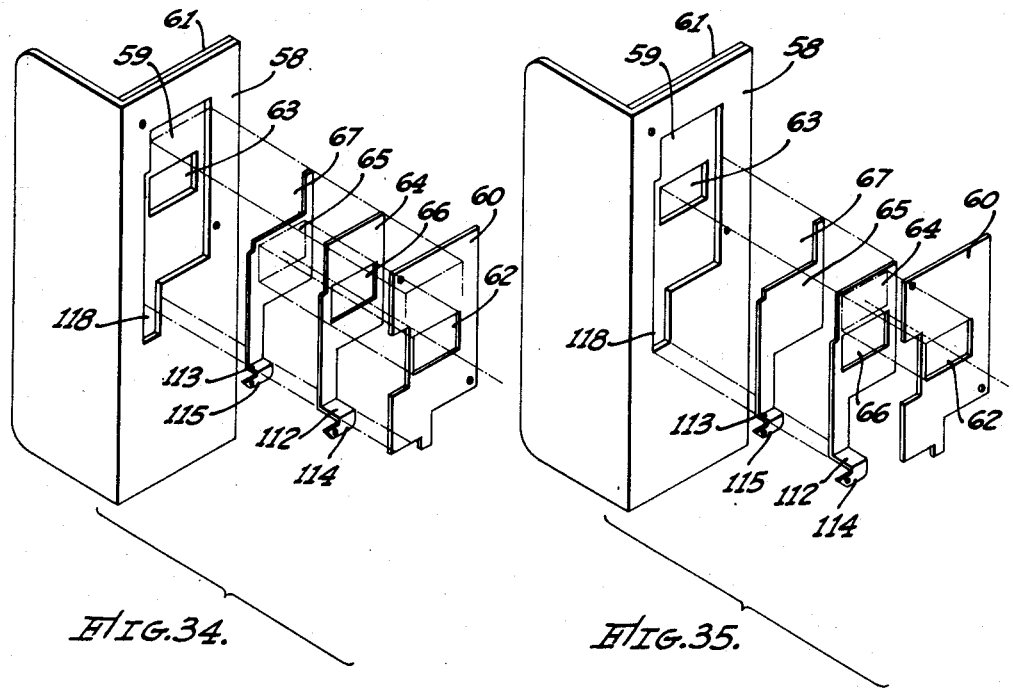
Fig. 34 is an isometric perspective of the focal plane shutters and their guides in the initial, or final, position as in Fig. 13.
Fig. 35 is a view similar to Fig. 34 with the shutters moved to the cocked position as in Fig. 23.

The camera being now cocked with a new film frame in position, the photographer makes the exposure by pressing in on the actuating plunger 56 which makes contact with the ear 160 of the trigger 154, causing the trigger to pivot on its rivet 155 and to move the pin 158 from the high shoulder 162 of the arm 92 to the low shoulder 163, as shown in Fig. 24. This permits the arm 92 to rise slightly, and consequently permits the lever 137 to rotate and to swing the stud 153 against the finger 147 of the pawl 143, knocking the tooth 146 of that pawl from behind the low radial shoulder of the lug 131 and allowing the motor to start unwinding, moving the cams counterclockwise. The pawl 143 is immediately cammed upward by the slope of the lug 131 above the radial shoulder, causing the hook 145 to release the detent 114. The aperture shutter 64 at once begins to rise to the position shown in Fig. 36, bringing the aperture 66 in line with the cutaway position 67 of the cut-off shutter 65 and thus exposing the film. As the lug 131 is moved past the pawl 143, the pawl is urged by the spring 152 to bring the finger 147 again in contact with the stud which has been moved only a little and still permits the tooth 146 to move close to the edge of the cam 126 where it will be in the path of the oncoming lug 132. When the lug 129 on the cam 124 has revolved to the top of the cam cycle, it pushes the tooth 149 of the pawl 148 upward, causing the release of the detent 115 of the cut-off shutter 65 from under the hook 151, as shown in Fig. 25. The cut-off shutter 65 follows the aperture shutter 64 upwardly, the two shutters, resuming their original positions as shown in Fig. 34 and cutting off the exposure of the film. The partial rise of the arm 92, resulting from moving the pin 158 from the high shoulder 162 to the low shoulder 163, moves the hooked end of the arm 92 out of contact with the lever 96, permitting the film feed bar to rise to its limit and to place the dog 100 in position to engage the next marginal perforation of the film on its next downstroke. The spring motor now comes to a stop as the radial face of the lug 132 comes in contact with the pawl 143, as shown in Fig. 26.

The speed of the above-described unwinding motion is governed by the escapement 172 acting upon the toothed wheel 170, and thence through the gear 169 to the gear 128, and by the pull of the spring 138 as adjusted by the position of the bolt 139. As these factors are calculable, the interval between the release of the aperture shutter 64 and the release of the cut-off shutter 65 may be governed by the clockwise angle at which the lug 129 is set relative to the lug 131. Except in the instance of the next described mode of operation, the lug 129 is always set outside the short segment between the lugs 131 and 132, so that it is advanced in a counterclockwise direction beyond both of them when the motor is cocked. It will therefore reach the top of the cam cycle and release the cut-off shutter before either of the other lugs can stop the movement.

The exposure having now been made, the photographer releases the plunger 56 which allows the trigger 154 to pivot in a clockwise direction. The pin 158 now moves into the recess 161 of the arm 92, allowing the arm to resume its original position. The lever 137 moves again in unison with the arm 92, causing the stud 153 to lift the pawl 143 from behind the lug 132, and letting the spring motor gently complete its unwinding until the movement is stopped by the pin 141 coming into contact with the segmental gear 136. All parts, with the exception of the film and film metering mechanism, are now in their original positions as shown in Figs. 9 and 13.

In order to take a time-exposure of a duration longer than that permitted by the snapshot timing mechanism, the photographer sets the pin 130 in that one of the holes 133 which brings the lug 129 into register with the clockwise portion of the lug 132 as shown in Figs. 27 to 29. This selection is, of course, suitably indicated on the time indicator 51. The operations of cocking the shutters and the spring motor are performed as previously described, the clockwise rotation of the cam 124 and 126 during the winding of the motor moving the lugs from the position shown in Fig. 27 to that shown in Fig. 28, which except for the juxtaposition of the lugs 129 and 132 is the same as that shown in Fig. 23. Upon release of the spring motor by pressure on the actuating plunger 56, the lug 131 reaches its pawl to set off the aperture shutter 64, but the counterclockwise movement of the lug 129 towards its pawl 148 is stopped by the prior arrival of the radial face of the lug 132 in contact with the pawl 143, which as previously noted returns to the path of that lug after releasing the aperture shutter. The cut-off shutter 65 therefore remains down until the photographer releases the actuating plunger 56, when movement of the trigger 154 results in lifting the pawl 143 from behind the lug 132, as in the last-described movement in making snapshots, and the lug 129 lifts the pawl 148 in the final unwinding of the motor.

As an alternative method of making snapshots, the photographer may begin by pushing in the actuating plunger 56 and turning it so that the wide part of the flange 166 enters the groove 168 and holds the plunger in its inward position. By so doing, he will initially move the trigger 154 to bring the pin 158 upon the low shoulder 163 of the arm 92 as shown in Fig. 33. It will be seen that all parts are now in the same position as in Fig. 26 with the exception that the spring motor is unwound. Depression of the control handle 53 moves the various parts in the same winding cycle as previously described for snapshots, but the trigger 154 is held against pivoting and the pin 158 remains above the low shoulder 163 instead of moving to the high shoulder 162. Consequently when the control handle 53 is allowed to move upward, the arm 92 moves at once to the position in Fig. 26, in which it permits the release of the shutters and the subsequent advance of another frame of film. The lever 137 is therefore allowed immediately to bring the stud 153 into contact with the finger 147, releasing the motor. Both shutters will be released in sequence as before and the parts will return to the position shown in Fig. 26—that is, with the arm 92 still held partly down by the pin 158 and the motor still partly wound. For subsequent exposures made while the plunger 56 remains held by the groove 168, the various parts will start from this position.

As the compression, or winding, stroke of the handle 53 is completed and the handle is being allowed to return with decreasing tension at the instant of releasing the motor, there is no trigger squeeze, or sudden release from an inrceasing force, that would tend to jar the camera. This feature, coupled with that of having the cocking and releasing of the shutters controlled by a single finger piece, makes this method of operation both safe and convenient, especially for taking photographs in rapid sequence.

To make a time exposure of long duration, for which it would be inconvenient to hold the actuating plunger manually, the last two described methods of operation may be combined. With the time indicator set for time exposure and the actuating plunger pushed in and held by its flange 166, the aperture shutter will be released with the release stroke of the handle 53. The cut-off shutter will remain cocked until the photographer turns the actuating plunger to release the flange 166. This combination has obvious advantages in making flash-light exposures of the kind in which the shutters are left open in darkness, to be closed later at the photographer's convenience after the subject of the picture, such as an intruder or wild animal, has set off a flash.

It is to be understood of course that while the form of my invention shown herein is fully capable of attaining the objects and providing the advantages hereinbefore mentioned, it is merely illustrative of the broad scope of my invention as defined in the appended claims.

I claim:

1. In a camera of the class described, an actuating arm manually operable in one direction, a spring urging return of said arm to an inactive position, a first shutter and a second shutter tensionable by the manual movement of said arm, shutter latching mechanism individual to each of said shutters, shutter releasing mechanism for said first shutter actuable by the spring urged movement of said arm, separate shutter releasing mechanism for said second shutter actuable by the movement of said first releasing mechanism at a predeterminable interval thereafter, a trigger engageable with said arm after the manual movement thereof to limit the return thereof whereby said first shutter releasing mechanism is held inactive, means for moving said trigger out of said limiting position to a position wherein it permits said first shutter releasing mechanism to become active, and means for initially locking said trigger in said last-named position whereby said first shutter releasing mechanism is automatically actuated by the return of said arm.

2. In a camera of the class described the combination of a first shutter and a second shutter, manually operable actuating means for moving said shutters to a tensioned position, latching means operable by the movement of said actuating means for holding said shutters in said tensioned position and for releasing them therefrom at a predeterminable interval, said last named means comprising a segmental gear lying in the path of said actuating means and movable thereby in one direction, a spring urging said segmental gear in the other direction, timing cams driven by said segmental gear to engage and operate said latching means for releasing said shutters successively when said cams are driven by the spring-urged movement of said segmental gear, and means for selectively adjusting said cams relatively to each other to vary the interval between their successive releasing actions.

3. In a camera of the class described the combination of a first shutter and a second shutter, manually operable actuating means for moving said shutters to a tensioned position, latching means operable by the movement of said actuating means for holding said shutters in said tensioned position and for releasing them therefrom at a predeterminable interval, said last-named means comprising a segmental gear lying in the path of said actuating means and movable thereby in one direction, a spring urging said segmental gear in the other direction, timing cams driven by said segmental gear to engage and operate said latching means for releasing said shutters successively when said cams are driven by the spring-urged movement of said segmental gear, means for selectively adjusting said cams relatively to each other to vary the interval between their successive releasing actions, an escapement mounted in geared relation to said cams for increasing the said interval, and means for adjusting the initial tension of said spring, whereby the delaying effect of said escapement may be varied.

4. In a camera, focal plane shutters, means for holding said shutters in a tensioned position and for releasing them therefrom, and mechanism for actuating said holding and releasing means comprising a manually operable actuating arm, a spring motor engageable by said arm and wound by the movement thereof in one direction, a spring urging said arm out of engagement with said motor when said motor is wound and said arm is released from manual pressure, a stop on said motor for halting the unwinding thereof prior to reengagement with said arm, whereby the tensions of said spring and said spring motor are successively additive when said arm is moved to wind said motor and said arm is freed from the torque of said motor during the unwinding thereof, and timing means operated by the action of said spring motor, actuating said holding means to release said shutters from said tensioned position.

5. In a camera, focal plane shutters, means for holding said shutters in a tensioned position and releasing them therefrom, and mechanism for actuating said holding and releasing means comprising a shaft, an actuating arm carried by said shaft, a spring motor including a segmental gear freely rotatable on said shaft and engageable by said actuating arm for movement thereby in one direction, a spring urging said segmental gear in the reverse direction, a second shaft, a pinion on said second shaft engageable by said segmental gear, means engageable with said shutter holding means for locking said motor when said arm-urged motion has been completed, means for moving said arm out of engagement with said segmental gear when said motor has been locked to permit movement of said segmental gear in the reverse direction, means for releasing said locking means, a pin supported by said second shaft and rotatable therewith in the plane of movement of said segmental gear at a radial distance from said second shaft greater than the radius of said pinion and positioned so that rotation of said second shaft, caused by movement of said segmental gear in the spring-urged direction, drives said pin to overtake said segmental gear and to halt the movement thereof while said segmental gear is disengaged from said arm, and timing means operated by the action of said spring motor, actuating said holding means to release said shutters from said tensioned position.

6. In a camera, focal plane shutters comprising a first shutter and a second shutter adapted for movement together to a tensioned and cocked position and for independent release and movement in the order named from said cocked position, the interval between their respective releases governing the duration of film exposure, and shutter releasing mechanism including a shaft, means for rotating said shaft in one direction when said shutters are to be cocked, a spring urging rotation of said shaft in the reverse direction when said shutters are to be released, a primary cam carried by said shaft for actuating the release of said first shutter, said cam having a high radial shoulder and a low radial shoulder and a lifting lug adjacent said low shoulder, said high shoulder being ahead of said low shoulder in the direction in which said cam rotates to release said shutter, a second cam having a single lifting lug, means holding said second cam in axial alignment with said primary cam, a first pawl engageable with said first shutter and with said low shoulder of said primary cam for cocking said shutter in tensioned position and for holding said cam from the rotation urged by said spring, said first pawl being releasable from said shutter by the lifting lug of said cam and engageable with said high shoulder for stopping said rotation, a second pawl engageable with said second shutter and with said second cam for cocking said second shutter in tensioned position and releasable from said second shutter by the lifting lug of said second cam, means for coupling said second cam to said primary cam to rotate therewith in selective cam sequence in such manner that during the spring urged rotation thereof the lifting lug of the one may follow the lifting lug of the other at a selected angle to the pawl lifting position but precede the high shoulder of the other thereto, or may follow both the lifting lug and the high shoulder of the other to said position, and means for moving said first pawl from the path of said low shoulder to permit the spring urged rotation of said cams and to bring said lifting lugs into successive shutter-releasing contact with their respective pawls.

7. In a camera, focal plane shutters comprising a first shutter and a second shutter adapted for movement together to a tensioned and cocked position and for independent release and movement in the order named from said cocked position, the interval between their respective releases governing the duration of film exposure, and shutter releasing mechanism including a shaft, means for rotating said shaft in one direction when said shutters are to be cocked, a spring urging rotation of said shaft in the reverse direction when said shutters are to be released, a primary cam carried by said shaft for actuating the release of said first shutter and having a high radial shoulder, a low radial shoulder, and a lifting lug adjacent said low shoulder, said high shoulder being ahead of said low shoulder in the direction in which said cam rotates to release said shutter, a second cam having a single lifting lug, means holding said second cam in axial alignment with said primary cam, a first pawl engageable with said first shutter and with said low shoulder of said primary cam for cocking said shutter in tensioned position and for holding said cam from the rotation urged by said spring, said first pawl being releasable from said shutter by the lifting lug of said cam and engageable with said high shoulder for stopping said rotation, a second pawl engageable with said second shutter and with said second cam for cocking said second shutter in tensioned position and releasable from said second shutter by the lifting lug of said second cam, means for coupling said second cam to said primary cam to rotate therewith in selective cam sequence in such manner that during the spring urged rotation thereof the lifting lug of the one may follow the lifting lug of the other at a selected angle to the pawl lifting position but precede the high shoulder of the other thereto, or may follow both the lifting lug and the high shoulder of the other to said position, means for moving said first pawl from the path of said low shoulder to permit the spring urged rotation of said cams and to bring said lifting lugs into successive shutter-releasing contact with their respective pawls, and an escapement acting upon said shaft to restrain the rotation thereof whereby the selected angle between said lifting lugs may be translated to a selected time interval.

8. In a camera, focal plane shutters comprising a first shutter and a second shutter adapted for movement together to a tensioned and cocked position and for independent release and movement in the order named from said cocked position, the interval between their respective releases governing the duration of film exposure, and shutter releasing mechanism including a shaft, means for rotating said shaft in one direction when said shutters are to be cocked, a spring urging rotation of said shaft in the reverse direction when said shutters are to be released, a primary cam carried by said shaft for actuating the release of said first shutter, said cam having a high radial shoulder and a low radial shoulder and a lifting lug adjacent said low shoulder, said high shoulder being ahead of said low shoulder in the direction in which said cam rotates to release said shutter, a second cam having a single lifting lug, means holding said second cam in axial alignment with said primary cam, a first pawl engageable with said first shutter and with said low shoulder of said primary cam for cocking said shutter in tensioned position and for holding said cam from the rotation urged by said spring, said first pawl being releasable from said shutter by the lifting lug of said cam and engageable with said high shoulder for stopping said rotation, a second pawl engageable with said second shutter and with said second cam for cocking said second shutter in tensioned position and releasable from said second shutter by the lifting lug of said second cam, means for coupling said second cam to said primary cam to rotate therewith in selective cam sequence in such manner that during the spring urged rotation thereof the lifting lug of the one may follow the lifting lug of the other at a selected angle to the pawl lifting position but precede the high shoulder of the other thereto, or may follow both the lifting lug and the high shoulder of the other to said position, means for moving said first pawl from the path of said low shoulder to permit the spring urged rotation of said cams and, when the lifting lug of said second cam is positioned to follow the high shoulder of said primary cam, to bring the lifting lug and the high shoulder of said primary cam into successive contact with said first pawl, and manually operable means inclusive of said last named means for thereafter moving said first pawl from the path of said high shoulder, whereby the rotation of said cams may be resumed and the lifting lug of said second cam be brought into shutter releasing contact with said second pawl to complete a time exposure.

9. A camera of the class described which includes: an actuating arm manually operable in one direction; a spring urging return of said arm to an inactive position; a first shutter and a second shutter tensionable by the manual movement of said arm; a first and a second shutter latching mechanism for said first and second shutters, respectively; shutter releasing mechanism for said first shutter actuable by the spring urged return movement of said arm; shutter releasing mechanism for said second shutter actuable by the movement of said first releasing mechanism at a predeterminable interval thereafter; a stop on said first shutter releasing mechanism engageable with said first shutter latching mechanism and selectively adjustable with reference to said second shutter releasing mechanism for halting the movement of said first releasing mechanism prior to the completion of its movement, and either prior to the actuation of said second releasing mechanism, to give a "bulb" or "time" exposure, or after the actuation of said second releasing mechanism, to give an "instantaneous" exposure; a trigger engageable with said arm after the manual movement thereof to limit the return thereof, whereby said first shutter releasing mechanism is held inactive; means for moving said trigger out of said limiting position to a position wherein it permits said first shutter releasing mechanism to become active; and spring means active when said trigger is released from the last-named position for moving said trigger to a position wherein it permits disengagement of said stop, whereby the movement of said first releasing mechanism is resumed, and said second releasing mechanism, if set for a "bulb" or "time" exposure, is thereafter actuated.

10. A camera of the class described which includes: an actuating arm manually operable in one direction; a spring urging return of said arm to an inactive position; a first shutter and a second shutter tensionable by the manual movement of said arm; a first and a second shutter latching mechanism for said first and second shutters, respectively; shutter releasing mechanism for said first shutter actuable by the spring urged return movement of said arm; shutter releasing mechanism for said second shutter actuable by the movement of said first releasing mechanism at a predeterminable interval thereafter; a trigger engageable with said arm after the manual movement thereof to limit the return thereof whereby said first shutter releasing mechanism is held inactive; means for moving said trigger out of said limiting position to a position wherein it permits said first shutter releasing mechanism to become active; means for initially locking said trigger in said last-named position whereby said first shutter releasing mechanism is automatically actuated by the return of said arm; a stop on said first shutter releasing mechanism engageable with said first shutter latching mechanism and selectively adjustable with reference to said second shutter releasing mechanism for halting the movement of said first releasing mechanism prior to the completion of its movement, and either prior to the actuation of said second releasing mechanism, to give a "bulb" or "time" exposure, or after the actuation of said second releasing mechanism, to give an "instantaneous" exposure; and spring means active when said trigger is released from the last-named position for moving said trigger to a position wherein it permits disengagement of said stop, whereby the movement of said first releasing mechanism is resumed, and said second releasing mechanism, if set for a "bulb" or "time" exposure, is thereafter actuated.

11. A camera of the class described which includes: a first shutter movable from open to closed position; a second shutter movable from closed to open position; a first spring means urging said first shutter to open position; a second spring means urging said second shutter to closed position; an engaging member operable to move said first and second shutters to closed and open positions, respectively, against the urging of their corresponding springs; first and second latching members associated with said first and second shutters, respectively, to hold said shutters tensioned in closed and open positions, respectively; a first shutter releasing mechanism to engage said first latching member for releasing said first shutter; a stop on said first shutter releasing mechanism to halt the operation thereof after the release of said first shutter but before the completion of the movement of said releasing mechanism; a second shutter releasing mechanism to engage said second latching member for releasing said second shutter, separate from but actuated by said first shutter releasing mechanism, and adjustable with respect to said first shutter releasing mechanism to release said second shutter at a predeterminable point in the cycle of operation of said first shutter releasing mechanism, the release of said second shutter prior to the halting of said first shutter releasing mechanism giving an "instantaneous" exposure, and the release subsequent thereto giving a "bulb" or "time" exposure; means to cause the actuation of said first shutter releasing mechanism; and a stop member movable from a first position where it engages said stop on said first shutter releasing mechanism, to a position clear of said stop to release said mechanism for completion of its cycle.

12. A camera of the class described which includes: an engaging member movable in one direction; a spring urging the return of said member in the opposite direction; a first and a second shutter tensionable by movement of said engaging member in said one direction; first and second latching means associated with said first and second shutters, respectively, to hold said shutters tensioned; a first shutter releasing mechanism movable through a complete cycle of operation, adjacent said first latching means to release said first shutter during the first portion of said cycle; a stop on said first shutter releasing mechanism to halt the movement thereof prior to the completion of said cycle; a second shutter releasing mechanism actuated by said first shutter releasing mechanism to operate said second latching means to release said second shutter, said second shutter releasing mechanism being selectively adjustable with respect to said first shutter releasing mechanism to release said second shutter either prior to the halting of said cycle to provide an "instantaneous" exposure, or after the halting of said cycle to provide a "bulb" or "time" exposure; means to cause the actuation of said first shutter releasing mechanism; and a stop member movable from a first position where it engages said stop on said first shutter releasing mechanism, to a position clear of said stop to release said mechanism for completion of its cycle.

ARTHUR P. NEYHART.

REFERENCES CITED

The following references are of record in the file of this patent:

UNITED STATES PATENTS

| Number | Name | Date |
|---|---|---|
| 2,036,326 | Frost | Apr. 7, 1936 |
| 2,068,911 | Goldhammer | Jan. 26, 1937 |
| 2,150,696 | Nelson | Mar. 14, 1939 |
| 2,161,941 | Zapp | June 13, 1939 |
| 2,169,548 | Zapp | Aug. 15, 1939 |
| 2,358,061 | Drotning | Sept. 12, 1944 |
| 2,408,549 | Brneske | Oct. 1, 1946 |